United States Patent
Picl et al.

(10) Patent No.: US 11,389,882 B2
(45) Date of Patent: Jul. 19, 2022

(54) MONITORING AND CONTROL OF A MILLING OPERATION

(71) Applicant: Muehlbauer GmbH & Co. KG, Roding (DE)

(72) Inventors: Alexander Picl, Maxhuette-Haidhof (DE); Uwe Franz Augst, Wackersdorf (DE); Franz Stengl, Altendorf-Fronhof (DE); Sigmund Niklas, Zell (DE)

(73) Assignee: MUEHLBAUER GMBH & CO. KG, Roding (DE)

( * ) Notice: Subject to any disclaimer, the term of this patent is extended or adjusted under 35 U.S.C. 154(b) by 588 days.

(21) Appl. No.: 16/477,472

(22) PCT Filed: Dec. 15, 2017

(86) PCT No.: PCT/EP2017/083019
§ 371 (c)(1),
(2) Date: Jul. 11, 2019

(87) PCT Pub. No.: WO2018/130372
PCT Pub. Date: Jul. 19, 2018

(65) Prior Publication Data
US 2021/0129235 A1 May 6, 2021

(30) Foreign Application Priority Data
Jan. 13, 2017 (DE) ...................... 10 2017 000 290.8

(51) Int. Cl.
*B23C 3/13* (2006.01)
*G05B 19/406* (2006.01)

(52) U.S. Cl.
CPC .............. *B23C 3/13* (2013.01); *G05B 19/406* (2013.01); *G05B 2219/45145* (2013.01)

(58) Field of Classification Search
CPC ......... F25B 49/02; H02P 27/06; G05B 19/406
(Continued)

(56) References Cited

U.S. PATENT DOCUMENTS

| 4,979,556 A | 12/1990 | Braun et al. |
| 7,508,152 B2 * | 3/2009 | Xu ..................... G05B 19/4163 700/173 |
| 2002/0070478 A1 | 6/2002 | Nissel |

FOREIGN PATENT DOCUMENTS

| DE | 102010015659 A1 | 10/2011 |
| EP | 1665912 B1 | 7/2012 |

(Continued)

OTHER PUBLICATIONS

PCT International Search Report of the International Searching Authority dated Apr. 19, 2018 and mailed Apr. 26, 2018 for International Application No. PCT/EP2017/083019 filed Dec. 15, 2017.

*Primary Examiner* — David Luo
(74) *Attorney, Agent, or Firm* — John A. Miller; Shumaker, Loop & Kendrick, LLP

(57) ABSTRACT

A milling device for milling an antenna structure out of the metal layer of a flexible product, while the product is being passed through a milling gap between a milling cutter and a die, using a light emitter to output a light strip that crosses through the milling gap in or transversely to a running direction of the product, wherein the light strip is dimensioned, and the milling cutter and the die are intended to be arranged, such that the milling cutter and the die shadow the light strip at the two longitudinal edges thereof, before a light receiver receives the light strip, and using the light receiver to output a signal that reproduces the width of the milling gap to a controller, and outputting an adjusting signal at least to an adjusting drive that influences the width of the milling gap between the milling cutter and the die.

10 Claims, 1 Drawing Sheet

S0: Sensor center
S1: Position of milling cutter
S2: Position of die cylinder
S3: Milling gap = S1 − S2

(58) Field of Classification Search
USPC .................................... 318/3, 558; 409/131
See application file for complete search history.

(56) References Cited

FOREIGN PATENT DOCUMENTS

| | | |
|---|---|---|
| WO | 9213652 A1 | 8/1992 |
| WO | 2005027599 A1 | 3/2005 |

* cited by examiner

S0: Sensor center
S1: Position of milling cutter
S2: Position of die cylinder
S3: Milling gap = S1 – S2

MONITORING AND CONTROL OF A MILLING OPERATION

CROSS-REFERENCE TO RELATED APPLICATIONS

This application is a National Stage application of International Application No. PCT/EP2017/083019 filed Dec. 15, 2017, which claims priority to German Patent Application Serial No. DE 10 2017 000 290.8, filed Jan. 13, 2017.

BACKGROUND

Field

Monitoring and control of a milling operation are described here, as well as a system and a method for their execution.

Discussion

Value and security documents are often produced centrally nowadays apart from personalization data and are then provided locally with personalization, for example at registration offices, authorities or in companies, which are authorized to issue such value and security documents. In the personalization process, text, numeric and/or photographic data identifying the respective bearer of the value and security document individually (for example, name and address of the bearer, date of birth, place of birth, photo of the bearer, biometric data of the bearer, etc.) is entered in the value and security document. This text, numeric and/or photographic data is directly readable by an observer. Transponder units are also being used increasingly in value and security documents. This permits contactless and automatic readout of data stored on a chip of the transponder unit. To this end the transponder unit has an antenna and a chip module with the chip, which are arranged on a carrier substrate. The antenna is connected in an electrically conductive manner to the chip module. The antenna can be realized in this case as an antenna coil, as a monopole antenna or as a dipole antenna or the like. These different antenna variants are generally termed antenna structures below.

In the manufacture of the antenna structures, the desired geometrical design of the antenna is milled using a controlled milling tool out of a metal layer (aluminum, copper or similar) laminated on an insulating (plastic) backing. In this process, the laminated web of backing plus metal layer is guided from a stock roll through a milling gap between a textured die and a milling cylinder. The die has a pattern of elevations and depressions. Parts of the metal layer are removed targetedly from the backing layer by the milling cylinder in accordance with the pattern on the die. Here the die and the laminated web are transported onwards in a controlled manner relative to the milling cylinder, due to which the desired design of the antenna structure is created.

To check the finished milling result, sensors monitor the design of the antenna and feed a signal back to the controller of the milling head. The milling gap width can be readjusted due to this feedback and suitable guidance of the milling tool. On account of the spatial distance between the point of engagement of the milling tool and the monitoring of the design of the finished antenna structure, recognition of whether the antenna structure was manufactured correctly often occurs too late. Corrective reworking of the antenna structure is not usually possible. Incorrectly milled antenna structures consequently result in an increased rejection rate.

Against this background the aim is to achieve more reliable production of antennas for smart label applications or labels with fewer reject parts occurring during the manufacture of the antennas.

SUMMARY

The object is therefore to reduce or completely avoid faulty milling results in the manufacture of antenna structures.

For the solution a device is proposed for monitoring and control of a milling operation of a milling cutter interacting with a die. The milling cutter is adapted here to mill at least one antenna structure out of the metal layer on a flexible product comprising a backing and a metal layer while the product is guided through a milling gap between the milling cutter and the die. To do this the device comprises a light emitter/receiver to output and receive a light strip that crosses through the milling gap in or transversely to a running direction of the product. The light strip can be oriented and dimensioned, and the milling cutter and the die arranged, so that the milling cutter and the die shadow the light strip at least at one of its two longitudinal edges before the light receiver receives the light strip. The light strip is thus characteristic of the width of the milling gap between the milling cutter and the die in one of its transverse dimension impinging at the light receiver. The light receiver can be adapted to output a signal reproducing the width of the milling gap to a controller. The controller can be adapted to output an adjusting signal at least to an adjusting drive that influences the width of the milling gap between the milling cutter and the die.

In continuous operation in particular with a high throughput, the thermal drift of the milling cutter that occurs can be compensated for with such an arrangement; thus the dimensions of the antenna structure also remain constant.

The device can be adapted to process a band guided from a first roll to a second roll as product. Alternatively to this, the device can be adapted to process a sheet guided from a first stack to a second stack.

A die is a template for the antenna structure provided with elevations and depressions. The die can be manufactured from zinc, copper, plastic, aluminum or magnesium, plastic, strip steel, solid steel or ceramic or can also consist of a multilayer composite of said materials; for a longer service life it can be provided with a (galvanic) surface finish. In the manufacture of the die, the areas on which the metal is to remain in the antenna structure to be realized with the die are removed by material abrasion.

Alternatively photographic manufacturing methods can also be used to manufacture the die. A photopolymer die has three layers: a backing plate e.g. of steel, a photopolymer layer (and a transparent protective layer of plastic). The photopolymer cures under UV light. Unexposed monomer material can thus be washed out easily; exposed, crosslinked polymer material is no longer soluble/washable. The subsequently raised areas of the die are exposed. The underside of the die can be cured with optional rear side exposure. The non-raised areas are washed out.

Direct laser engraving is used alternatively to manufacture the die. In this case a laser beam removes the non-raised areas from the die. To do this, the laser beam, controlled by a computer, wears down the rotating die drawn onto a cylinder and leaves the raised areas in place.

The milling cutter and the die can be realized in one variant as cylindrical rolls or rollers, which are arranged parallel to one another, forming the milling gap, and rotating about their longitudinal axis. To change the width (=distance between milling cutter and die) of the milling gap, the adjusting drives are provided with which the distance of the milling cutter and/or of the die can be varied relative to one another. The arrangement is configured so that the adjustment of the distance between milling cutter and die does not influence their parallel alignment to one another. The die can be attached magnetically or adhesively in operation of the device to a drum or roll.

The light emitter/receiver can be formed to detect a position of the milling cutter and/or a thermal expansion of the milling cutter and/or of the die during operation of the device. To do this the light emitter supplies a light strip of visible or invisible light. The light receiver is oriented to the light emitter so that the light receiver registers a geometrical change in the light strip due to obstacles along the path of the light strip. The light strip can be a light beam that is rectangular or polygonal, round or elliptical in cross section.

The controller can be adapted to change the position of the milling cutter and/or of the die by means of the adjusting drive/adjusting drives if the width of the milling gap between the milling cutter and the die falls below or exceeds a predefined threshold value.

The width of the milling gap between the milling cutter and the die can result from a shortest distance of a circular motion of the blades of the milling cutter to a base of the die (=recessed area of the die).

A chip extraction device can be arranged on the milling cutter and be adapted to suck away metal chips milled by the milling cutter out of the metal layer, so that these adversely affect the light strip crossing through the milling gap as little as possible.

A method for the monitoring and control of a milling operation of a milling cutter interacting with a die can have the following steps: milling of at least one antenna structure out of the metal layer on a flexible product having a backing and a metal layer, while the product is guided through a milling gap between the milling cutter and the die; outputting of a light strip crossing through the milling gap in or transversely to a running direction of the product by a light emitter, wherein the light strip is dimensioned, and the milling cutter and the die are intended to be arranged, so that the milling cutter and the die shadow the light strip at least at one of its two longitudinal edges before a light receiver receives the light strip, wherein a transverse dimension of the light strip is characteristic of the width of the milling gap between the milling cutter and the die; and outputting of a signal reproducing the width of the milling gap by the light receiver to a controller; and outputting of an adjusting signal at least to an adjusting drive that influences the width of the milling gap between the milling cutter and the die.

The signal output by the light receiver can contain the width of the milling gap, the position of the milling cutter or the position of the die, wherein the signal containing the width of the milling gap contains a difference of the position of the milling cutter and the position of the die (relative position), or the signal containing the position of the milling cutter contains an absolute position of the circular motion of the milling cutter relative to a sensor center or a sensor edge of the light receiver, or the signal containing the position of the die contains an absolute position of the base of the die relative to a sensor center or a sensor edge of the light receiver.

The light strip crossing through the milling gap in or transversely to a running direction of the product encloses with a surface or a transverse axis of the (web-shaped) product—viewed in or transversely to its running direction—an angle of between 10° and 170°, preferably 180°.

The device/method presented here has the advantage of being able to check the geometry and in particular a contour of the antenna structure on the backing especially close to the location of the milling and to adhere very closely to the target geometry, the target contour. Furthermore, the thickness of the antenna structure at the point of milling can also be checked.

The light emitter/receiver can be formed as an optical micrometer and detect the position of the milling cutter and/or of the die, and/or the thermal expansion of the milling cutter and/or of the die during operation. The light emitter/receiver can detect position changes <1 μm.

If the position of the milling cutter deviates from a predetermined target position relative to the backing in such a way that a predefined threshold value is exceeded, the processing unit can be formed to supply a correction signal to the adjusting motor, in order to correct the position of the milling cutter relative to the backing.

The adjusting drive can be formed to move the milling cutter and/or the die, based on the correction signal, so that the position of the milling cutter relative to the die is corrected in the direction of the target position. This has the advantage of detecting position changes directly in operation of the milling cutter and of counteracting this change via the adjusting drive without any temporal or spatial delay.

The position of the milling cutter can result from a distance of a milling cutter edge or the circular motion of the cutting edges of the milling cutter to a point defined by the light emitter/receiver (optical micrometer). The milling cutter edge can be a point from which a shortest distance results between the milling cutter and the die.

The light emitter/receiver/the optical micrometer can be arranged so that a transverse direction of the light band runs perpendicular to a running direction of the backing.

Even if some of the aspects described above were described in regard to the method, these aspects can also apply to the device. In exactly the same way the aspects described above in regard to the device can apply accordingly to the method.

BRIEF DESCRIPTION OF THE DRAWINGS

Other aims, features, advantages and application possibilities result from the following description of exemplary embodiments, which are to be understood as non-restrictive with reference to the associated drawings. Here all features described and/or illustrated show the subject matter disclosed here by themselves or in any combination, even independently of their grouping in the claims or their back-references. The dimensions and proportions of the components shown in the figures are not necessarily to scale in this case; they may differ from what is shown here in embodiments to be implemented.

DETAILED DESCRIPTION OF THE EMBODIMENTS

The method variants of the device described here and their functional and operating aspects serve only for a better understanding of their structure, mode of operation and properties; they do not limit the disclosure to the exemplary embodiments. The figures are partly schematic, wherein substantial properties and effects are depicted significantly enlarged in part, in order to clarify the functions, active principles, technical configurations and features. Here every mode of operation, every principle, every technical configuration and every feature which is/are disclosed in the figures or in the text can be combined freely and in any way with all claims, every feature in the text and in the other figures, other modes of operation, principles, technical configurations and features that are contained in this disclosure or result from it, so that all conceivable combinations are to be associated with the devices described. In this case combinations between all individual implementations in the text, meaning in each section of the description, in the claims and also combinations between different variants in the text, in the claims and in the figures are also comprised and can be made the subject matter of further claims. Nor do the claims limit the disclosure and thus the combination possibilities of all features demonstrated with one another. All disclosed features are also explicitly disclosed here individually and in combination with all other features.

In the figures, components corresponding to one another or similar in function are provided with corresponding reference signs. The method and the device are now described by means of exemplary embodiments.

Figure 1:
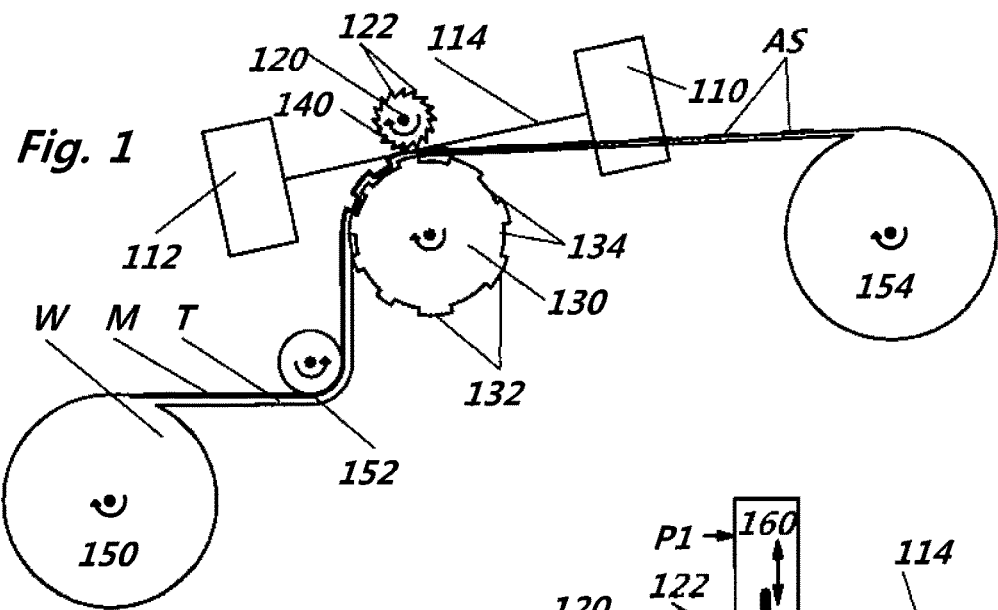
FIG. 1 shows a schematic lateral plan view of a device for manufacturing antenna structures from a metal layer laminated on an insulated backing using a controlled milling tool with monitoring of the milling operation.
Figure 2:
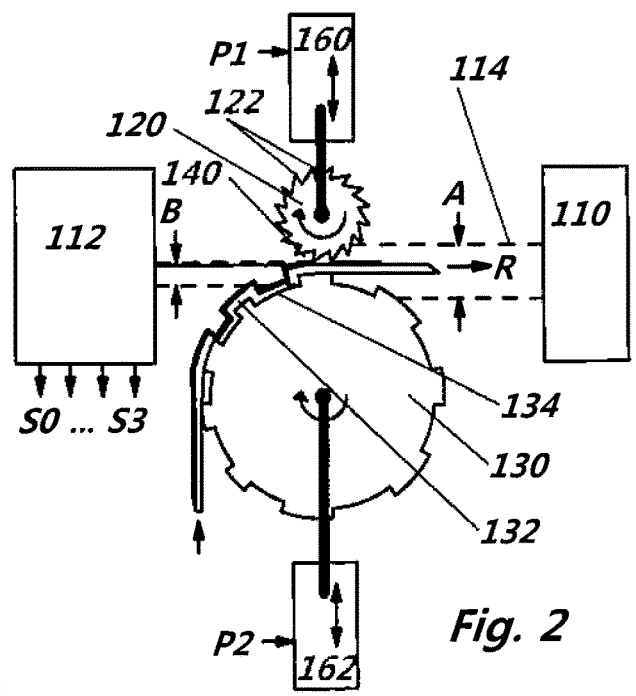
FIG. 2 shows an enlarged section of the milling cutter interacting with the die and the associated controller for monitoring the milling operation.

FIGS. 1 and 2 show a schematic lateral plan view of a device 100 for the manufacture of antenna structures from a metal layer M laminated on an insulating backing T using a controlled milling tool with monitoring of the milling operation. In one example this backing T is a PET layer of preferably 35-36 μm thickness, onto which an aluminum layer of 9 μm thickness is rolled. The aluminum layer can be bonded at least partially to the backing T by means of an adhesive layer. The backing T with the metal layer M is configured in the variant shown here as a quasi-endless band-shaped product W. In one embodiment the metal layer M can also be a layer containing copper and have a thickness of 15-40 μm, preferably 25-35 μm.

For the milling operation the device 100 has a milling cutter 120 interacting with a die 130. The milling cutter 120 has a roll form with cutting edges 122 running parallel to its central longitudinal axis. Together with the milling cutter 120, the die 130, which is likewise in the form of a roll here and is arranged parallel to the milling cutter 120 and arranged at a distance from this, forms a milling gap 140, which is rectangular in cross section. This milling gap 140 is variable in the manner described further below. The milling cutter 120 is intended to be set in rotation (approx. 800-1000 rpm) about its central longitudinal axis by means of a milling drive, which is not illustrated further. The die 130 is likewise intended to be set in rotation about its central longitudinal axis by means of a die drive, which is not illustrated further.

The endless product W is supplied from a stock roll 150 via a deflection roller 152 in a running direction R to the milling gap 140 between the die 130 and the milling cutter 120. While the product W is being guided through the milling gap 140 between the milling cutter 120 and the die 130, the milling cutter 120 removes areas of the metal layer M in a targeted manner to form the antenna structure AS on the backing T. Here the product W is held under tensile stress so that it fits snugly around the elevations 132 and into the depressions 134 of the die 130. The areas of the metal layer M presented by the elevations 132 of the die 130 to the cutting edges 122 of the milling cutter 120 are removed by the cutting edges 122 so that the backing T lying under the metal layer M is not or is scarcely adversely affected. The product W emerging from the milling gap 140 in the running direction R is wound onto a product roller 154.

Figure 3:
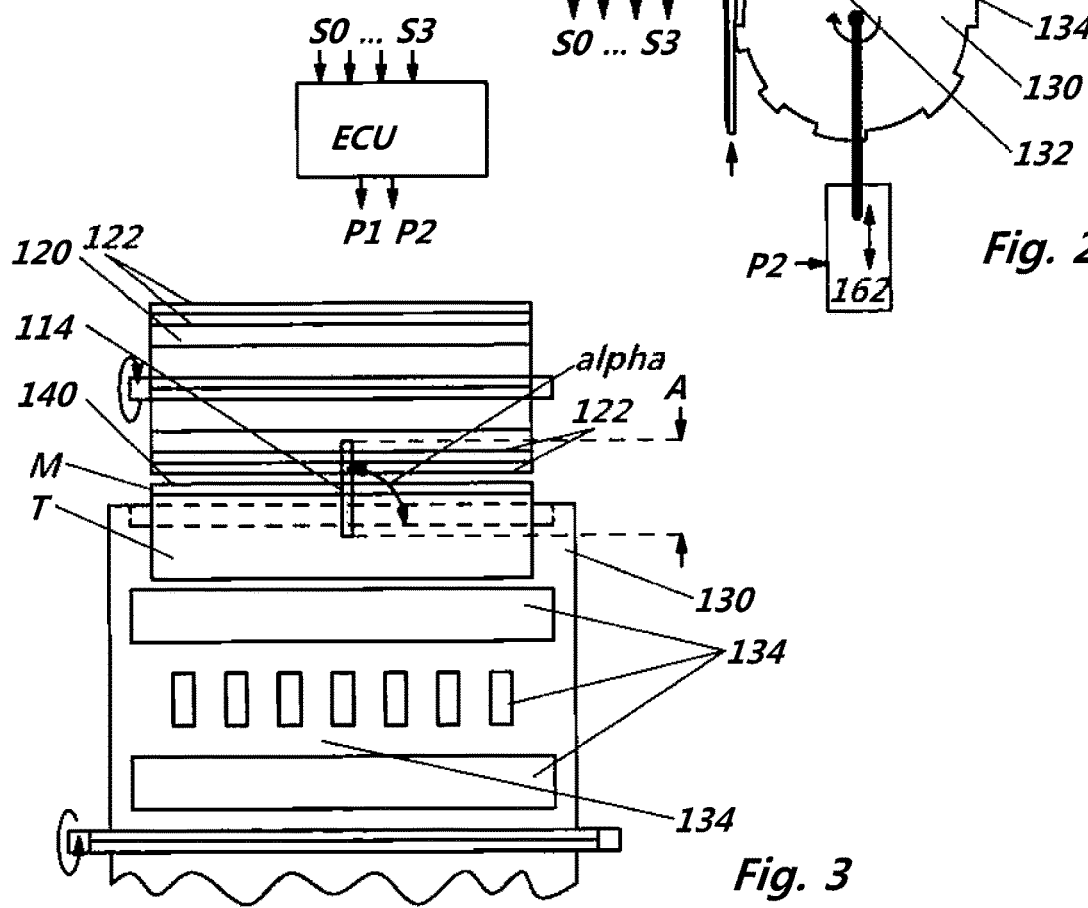
FIG. 3 shows an enlarged schematic plan view depiction of the milling cutter interacting with the die, seen from the light emitter towards the conveying direction of the band-shaped product.

On the product exit side of the milling gap 140 (closer to the product roller 154) a light emitter 110 is provided to output a light strip 114 crossing through the milling gap 140. This light strip 114 is received on the product entry side of the milling gap 140 (closer to the stock roll 150) by a light receiver 112 and is evaluated in a manner explained in detail further below. The light strip 114 has a rectangular cross-sectional shape in the variant illustrated here, which is oriented at a right angle alpha (see FIG. 3) perpendicularly from a surface of the product W—here the metal layer surface. The transverse dimension of the light strip 114 on the product entry side of the milling gap 140 after the light strip 114 has passed the milling gap 140 is characteristic of the width of the milling gap 140 between the milling cutter 120 and the die 130.

The emitter/light receiver 110, 112 can be realized by an optical micrometer. The emitter 110 is formed here to generate the light strip 114. Based on the light strip 114, a position of the milling cutter 120 relative to a (center) point defined by the optical micrometer is determined in a running direction of the backing. This (center) point is the center of the receiver sensor. This position of the (center) point is output by the light receiver 112 as a numerical value S0. Based on the position of the milling cutter 120, the milling operation is then monitored by the controller ECU. The light receiver 112 evaluates the transverse dimension of the light strip 114 in order to output a signal S1 . . . S3 reproducing the width of the milling gap 140 to the controller ECU.

The device 100 also has two adjusting drives 160, 162, which are connected to the controller ECU.

The adjusting drives 160, 162 are mounted on the milling cutter 120 on the one hand and on the die 130 on the other. A relative position, the milling gap width between milling cutter 120 and die 130, can be adjusted thereby.

The position of the milling cutter 120 relative to the die 130 and a thermal expansion of the milling cutter 120 during the operation of the milling cutter 120 are detected by the optical micrometer 110. If the position of the milling cutter 120 deviates from a predetermined target position, so that a predefined threshold value is exceeded, the controller ECU supplies the adjusting drives 160, 162 with corresponding correction signals P1, P2, whereupon the position of the milling cutter 120 is corrected relative to the die 130. In this case the milling cutter 120, the die 130 or both are moved relative to one another to correct the position of the milling cutter relative to the die 130 in the direction of the target position. Here the position of the milling cutter 120 results from a distance of a milling edge of the milling cutter 120 to a point defined by the optical micrometer 110. This defined point can lie in a predetermined center point of the optical micrometer. The milling edge is regarded in this case as an end point, from which a shortest distance between the milling cutter 120 and the backing results. Here the circular motion of the cutting edges 122 of the milling cutter 120 is detected as the end point. The start and end point result from a surface of the die 130 and the cutting edges 122 of the milling cutter 120. The start point and end point then form a shortest distance between milling cutter and backing.

In addition, the optical micrometer can not only be connected to the controller ECU, but also contain this to create a more compact construction. The processing unit monitors the position of the milling cutter 120 during a milling operation of the milling cutter 120. A special arrangement provides that the milling cutter is arranged underneath the die 130. In FIG. 1 an arrangement is shown in which the milling cutter 120 is arranged above the die 130. In one embodiment the milling cutter 120 can thus also be moved from underneath towards the die 130 to execute the milling operation.

The method for monitoring a milling operation comprises generation of a light strip by an optical micrometer. The method further comprises determination by the optical micrometer, in a running direction of the backing, of a position of a milling cutter relative to a point defined by the optical micrometer, based on the light strip. In the next step, the position of the milling cutter including thermal expansion of the milling cutter and/or of the die during operation is detected. Monitoring of the milling operation by a processing unit is based on the determined position of the milling cutter. Monitoring of the position of the milling cutter takes place during a milling operation of the milling cutter directly at the milling location. Variation of the position of the milling cutter relative to the die—and thus of the width of the milling gap—by suitable adjusting drives is based on monitoring of the milling operation. The width of the milling gap between the milling cutter and the die results from a shortest distance of a circular motion of the blades of the milling cutter to a base of the die. The variation comprises correction of the position of the milling cutter relative to the die if the position of the milling cutter diverges from a predetermined target position relative to the die so that a predefined threshold value is exceeded. The threshold value can be determined by an amount of a distance from the target position. In the event of a certain divergence from or an exceeding of the amount, the current position, which deviates from the target position, is adjusted so that a future position at least approximately assumes the target position. The variation also comprises a movement of the milling cutter and/or of the die, based on a correction signal supplied by the controller to the adjusting drives, so that the position of the milling cutter relative to the die is corrected in the direction of the target position. The position of the milling cutter relative to the die can thus be adjusted by moving the adjusting drive at the milling cutter and/or the die.

Using a chip extraction device, which is not illustrated further in the figures, with the milling cutter, metal chips milled out of the metal layer by the milling cutter can be sucked away. These metal chips can thus shadow the light strip crossing through the milling gap when it impinges on the light receiver and thereby adversely affect the measuring result as little as possible.

The milling of a continuous sequence of antenna structures out of the metal layer on a flexible product having a backing and a metal layer, while the product is guided through the milling gap between the milling cutter and the die, is achieved by outputting by a light emitter of a light strip crossing through the milling gap in or transversely to a running direction of the product. The light strip is arranged and dimensioned, and the milling cutter and the die are intended to be arranged, so that the milling cutter and the die shadow the light strip at least at one of its two longitudinal edges. On the side lying before the milling gap (near the light emitter) the light strip has the width between the arrows "A". On the side lying after the milling gap (near the light receiver) the light strip has the width between the arrows "B". When the light receiver receives the light strip, its transverse dimension is characteristic of the width of the milling gap. The controller connected to the light receiver receives a signal S1 . . . S3, which reproduces the width of the milling gap, from the light receiver. The controller then outputs corresponding adjusting signals P1, P2 to the adjusting drives that influence the width of the milling gap. The signal S1 . . . S3 output by the light receiver contains the width of the milling gap, the position of the milling cutter or the position of the die. The signal containing the width of the milling gap contains a difference of the position of the milling cutter and the position of the die, or the signal containing the position of the milling cutter contains an absolute position of the circular motion of the milling cutter with regard to a sensor center of the light receiver, or the signal containing the position of the die contains an absolute position of the base of the die with regard to a sensor center of the light receiver.

The invention claimed is:

1. A milling device for manufacturing antenna structures out of a metal layer laminated on an insulating backing with
   a controlled milling cutter and with
   a controller for monitoring and controlling the milling operation of the milling cutter interacting with a die, wherein
   the milling cutter is adapted to mill at least one antenna structure out of a metal layer on a flexible product having the backing and the metal layer, while the product is guided through a milling gap between the milling cutter and the die, the device comprising:
   a light emitter/receiver for outputting and receiving a light strip crossing the milling gap in or transversely to a running direction of the product, wherein a transverse dimension of the light strip is characteristic of the width of the milling gap between the milling cutter and the die, and wherein the light receiver is adapted to output a signal reproducing the width of the milling gap to the controller, and wherein the controller is adapted to output an adjusting signal at least to an adjusting drive that influences the width of the milling gap between the milling cutter and the die.

2. The device according to claim 1, wherein the light strip is oriented and dimensioned, and the milling cutter and the die are intended to be arranged, so that the milling cutter and the die shadow the light strip at least at one of its two longitudinal edges, before the light receiver receives the light strip.

3. The device according to claim 1, wherein the product is a band guided from a first roller to a second roller.

4. The device according to claim 1, wherein the light emitter/receiver is formed to detect a position of the milling cutter and/or a thermal expansion of the milling cutter and/or a position of the die during operation of the device.

5. The device according to claim 1, wherein the controller is adapted to change the position of the milling cutter and/or the die if the width of the milling gap between the milling cutter and the die falls below or exceeds a predefined threshold value.

6. The device according to claim 1, wherein the width of the milling gap between the milling cutter and the die results from a shortest distance of a circular motion of the blades of the milling cutter to a base of the die.

7. The device according to claim 1, wherein a chip extraction device is arranged on the milling cutter and is adapted to extract metal chips milled by the milling cutter out of the metal layer, so that these adversely affect the light strip crossing through the milling gap as little as possible.

8. A method for monitoring and controlling a milling operation for the manufacture of antenna structures with the steps:

providing a milling device with a controlled milling cutter, a die and a controller for monitoring and controlling the milling operation of the milling cutter interacting with the die, milling of at least one antenna structure out of a metal layer on a flexible product having a backing and the metal layer, while the product is guided through a milling gap between the milling cutter and the die;

outputting a light strip crossing through the milling gap in or transversely to a running direction of the product by a light emitter, wherein the light strip is dimensioned, and the milling cutter and the die are intended to be arranged, so that the milling cutter and the die shadow the light strip at least at one of its two longitudinal edges before a light receiver receives the light strip, wherein its transverse dimension is characteristic of the width of the milling gap between the milling cutter and the die, outputting a signal reproducing the width of the milling gap by the light receiver to a controller, and outputting an adjusting signal at least to an adjusting drive that influences the width of the milling gap between the milling cutter and the die.

9. The method according to claim 8, wherein the signal output by the light receiver contains the width of the milling gap, the position of the milling cutter or the position of the die, wherein the signal containing the width of the milling gap contains a difference of the position of the milling cutter and the position of the die, or the signal containing the position of the milling cutter contains an absolute position of the circular motion of the milling cutter with regard to a sensor center of the light receiver, or the signal containing the position of the die contains an absolute position of the base of the die with regard to a sensor center of the light receiver.

10. The method according to claim 8, wherein the light strip crossing through the milling gap in or transversely to a running direction of the product encloses with the product—viewed in or transversely to its running direction—an angle between 10° and 170°, preferably 180°.

* * * * *